United States Patent [19]
Robinson et al.

[11] Patent Number: 5,113,754
[45] Date of Patent: May 19, 1992

[54] APPARATUS FOR PROCESSING SANDWICH INGREDIENTS

[75] Inventors: Hugh Robinson, Wenham; Marvin Menzin, Lexington, both of Mass.

[73] Assignee: Design Technology Corporation, Billerica, Mass.

[21] Appl. No.: 505,610

[22] Filed: Apr. 6, 1990

Related U.S. Application Data

[63] Continuation-in-part of Ser. No. 66,733, Jun. 23, 1987, abandoned.

[51] Int. Cl.⁵ .......................... A21C 9/04; B32B 31/04
[52] U.S. Cl. .......................................... 99/326; 99/355; 99/357; 99/387; 99/423; 99/443 C; 99/450.4
[58] Field of Search ................ 99/450.1, 450.4, 450.5, 99/387, 326, 357, 355, 386, 400, 423, 443 C; 221/150 A, 150 R, 150 HC; 53/122, 157, 540; 414/790.7, 793.5

[56] References Cited

U.S. PATENT DOCUMENTS

| | | | |
|---|---|---|---|
| 2,168,390 | 8/1939 | Bemis | 99/400 |
| 3,183,856 | 5/1965 | Jolly | 99/450.4 |
| 3,229,616 | 1/1966 | Reese | 99/386 |
| 3,266,442 | 8/1966 | Udall et al. | 99/450.4 |
| 3,364,878 | 1/1968 | Kobori et al. | 99/450.4 |
| 3,528,361 | 9/1970 | LeVan | 99/400 |
| 3,646,879 | 3/1972 | Palmason et al. | 99/386 |
| 3,664,257 | 5/1972 | Meyer | 99/400 |
| 4,202,260 | 5/1980 | Weger | 99/450.4 |
| 4,685,387 | 8/1987 | Hanson et al. | 99/450.1 |
| 4,944,218 | 7/1990 | Cresson | 99/357 |

Primary Examiner—Timothy F. Simone
Attorney, Agent, or Firm—E. T. Barrett

[57] ABSTRACT

An automatic sandwich preparation system in which each sandwich is prepared under the control of a computer with condiments as ordered. Meat patties are packaged in spaced positions along a plastic strip and then frozen. The strips are packed in shipping and storing containers that are received by the automatic sandwich preparation equipment. The meat patties are removed from the strip by directing the strip over a small diameter roller that frees the patty. Two face-to-face plastic strips may be heat sealed to form pockets for the meat patties and also for serving portions of other sandwich components such as chopped vegetables, catchup, mustard and the like. The contents are removed by physical separation of the two strips. In another arrangement, ground meat is formed into a log shape that is frozen. While the log remains frozen individual meat patties are sawed from the log.

9 Claims, 8 Drawing Sheets 5,113,754

APPARATUS FOR PROCESSING SANDWICH INGREDIENTS

REFERENCE TO RELATED APPLICATION

This application is a continuation-in-part of copending application Ser. No. 07/066,733, filed Jun. 23, 1987 now abandoned and assigned to the same assignee as the present application.

BACKGROUND OF THE INVENTION

This invention relates to the rapid and automatic preparation of sandwiches by a system that combines storage of the necessary ingredients, such as rolls, meat patties, and condiments and the automatic custom preparation and delivery of the sandwich. More particularly it relates to systems for preparing, storing, handling and dispensing meat and other food components of sandwiches.

BRIEF DESCRIPTION OF THE RELATED ART

In the so-called fast-food industry, the profitability of a food outlet is highly dependent upon the speed with which the food can be delivered and the cost of labor in preparing and packaging the food. There are other factors that can enhance the sales, but these must be done in a manner efficient enough to maintain the necessary profitability. It has been the more usual practice to standardize the food preparation and thereby simplify and lower the cost of preparation. The high volume of such food outlets justifies the special preparation of food products prior to delivery to the food outlet to simplify automatic handling and provide more assured sanitation.

SUMMARY OF THE INVENTION

The present invention is applicable in various respects to different sandwich combinations, but is described as embodied in an automatic hamburger outlet system in which a sales person enters an order on one of several registers and, within a bit more than one minute, a custom cooked-to-order hamburger is delivered automatically to a collection area or to a tray adjacent the register. Each hamburger is prepared in accordance with the instructions entered on the register. For example, the hamburger may be cooked rare, medium or welldone, and topped with the particular condiments selected by the customer. Moreover, the carton in which the hamburger is delivered is printed with the particular customer specifications for that hamburger and with a code indicating the particular customer order. A conveyor automatically delivers each hamburger carton to a designated area or to a collection tray in the vicinity of the particular register on which the order was entered. In one aspect of the invention meat patties are formed, frozen and packed in a continuous container that is opened at the food outlet and delivered to the roll without the necessity for handling by outlet personnel. In a related development other food condiments are prepackaged in serving portions adapted for automatic dispensing.

The system makes advantageous use of labor by permitting necessary tasks to be performed in advance during slack periods. For example, the morning period prior to the noon rush may be used to fill the storage containers of the automatic food preparation system. The system can then operate for one and one-half hours during the noon rush without further attention other than by an attendant to insure proper operation of the system. The various advantages will be apparent from consideration of the more detailed description of the specific embodiments of the invention.

DESCRIPTION OF THE PREFERRED EMBODIMENTS

Figure 1:
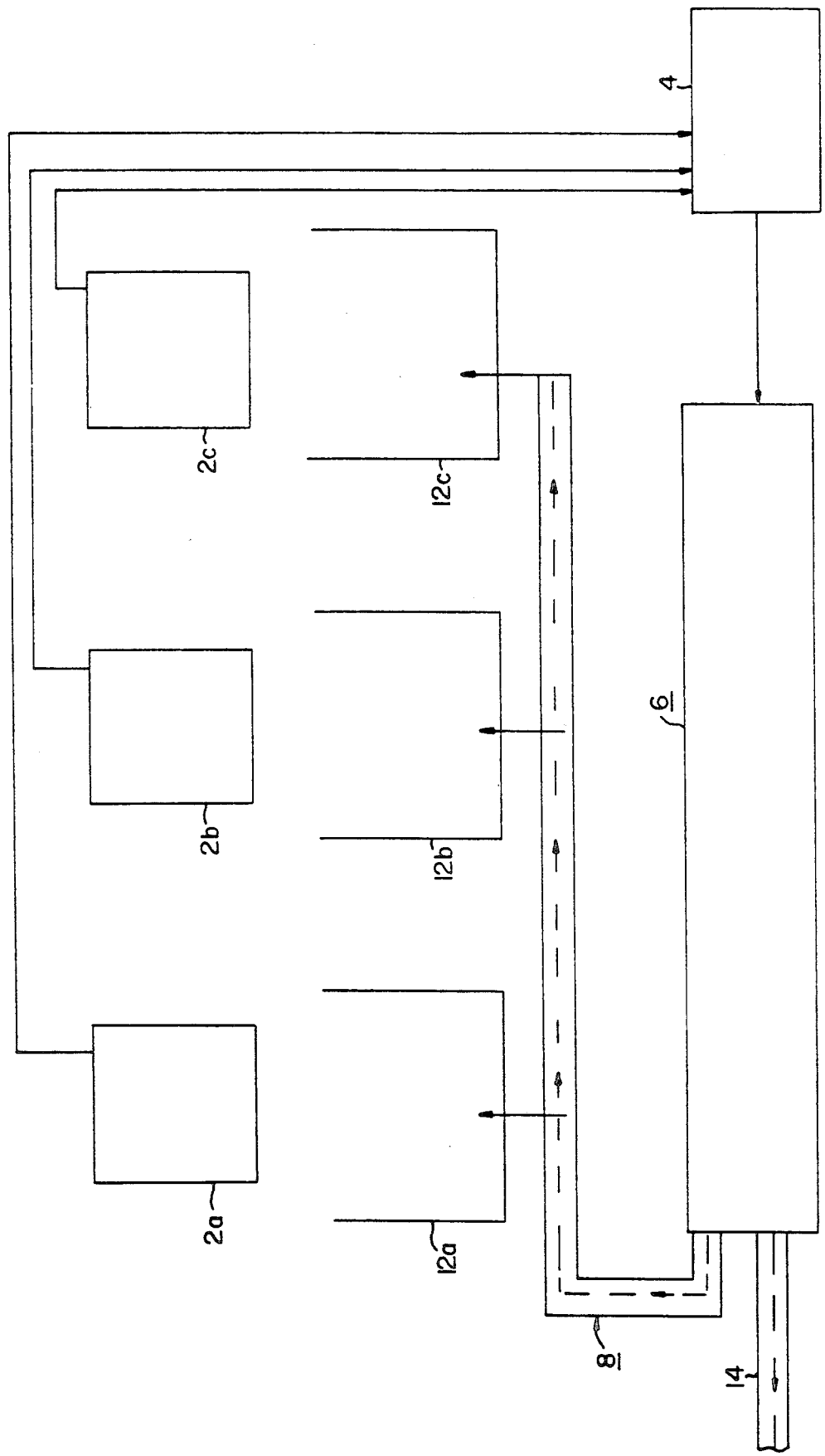
FIG. 1 is a diagrammatic view of an automated hamburger preparation and delivery system embodying the invention.

FIG. 1 illustrates diagrammatically the overall operation of the system. Orders are entered by the sales persons at the registers 2a, 2b and 2c. Each time an order is entered, the sales person specifies the cooking instructions, the size of the hamburger patty, and the particular condiments that are to be placed in the bun. This information, along with the order and station codes, is transmitted to a computer 4 that controls the operation of the hamburger processor and delivery system, generally indicated at 6. A printing mechanism under the control of the computer 4 prints the carton with the particular specifications for degree of doneness, adornments, and station and order codes The computer causes the crown of a bun to be removed from storage, grilled, placed in the carton, printed with the appropriate information, and moved successively through the stages of the preparation system in which the selected kinds and amounts of condiments are automatically applied to the bun crown.

The finished sandwich may be delivered to an area near the register at which the order was placed or it may be delivered to a special area where an en&ire order is collected under the control of the computer 4.

At the same time the bun crown is removed from storage, the computer starts a hamburger patty through the broiler and cook's it to the specified degree of doneness. The "upside down" preparation of the bun saves processing time because it permits the condiments to be added to the bun during the time the hamburger is being cooked. Hamburgers may be cooked by broiling or grilling by direct contact with a hot surface. Generally all such methods are referred to herein as "broiling". When the particular crown reaches the broiler station, the meat patty is placed on the crown which continues along the conveyor system to receive other ingredients. such as cheese. While the meat patty is broiling. the computer also removes a bottom portion of the roll from storage, preheats it in a microwave region. and toasts it, and when the patty and crown arrive at this station, the bottom bun portion is placed on top of the assembly. The carton is then closed automatically and placed on a conveyor, generally indicated at 8. The conveyor 8 returns the carton to a collection bin 12a, 12b or 12c in the area of the particular register where the order was placed or to an order-collection area. If the order was placed from a drive-in window, a conveyor belt, generally indicated at 14, receives the carton and transports it to the drive-in window area.

Figure 2:
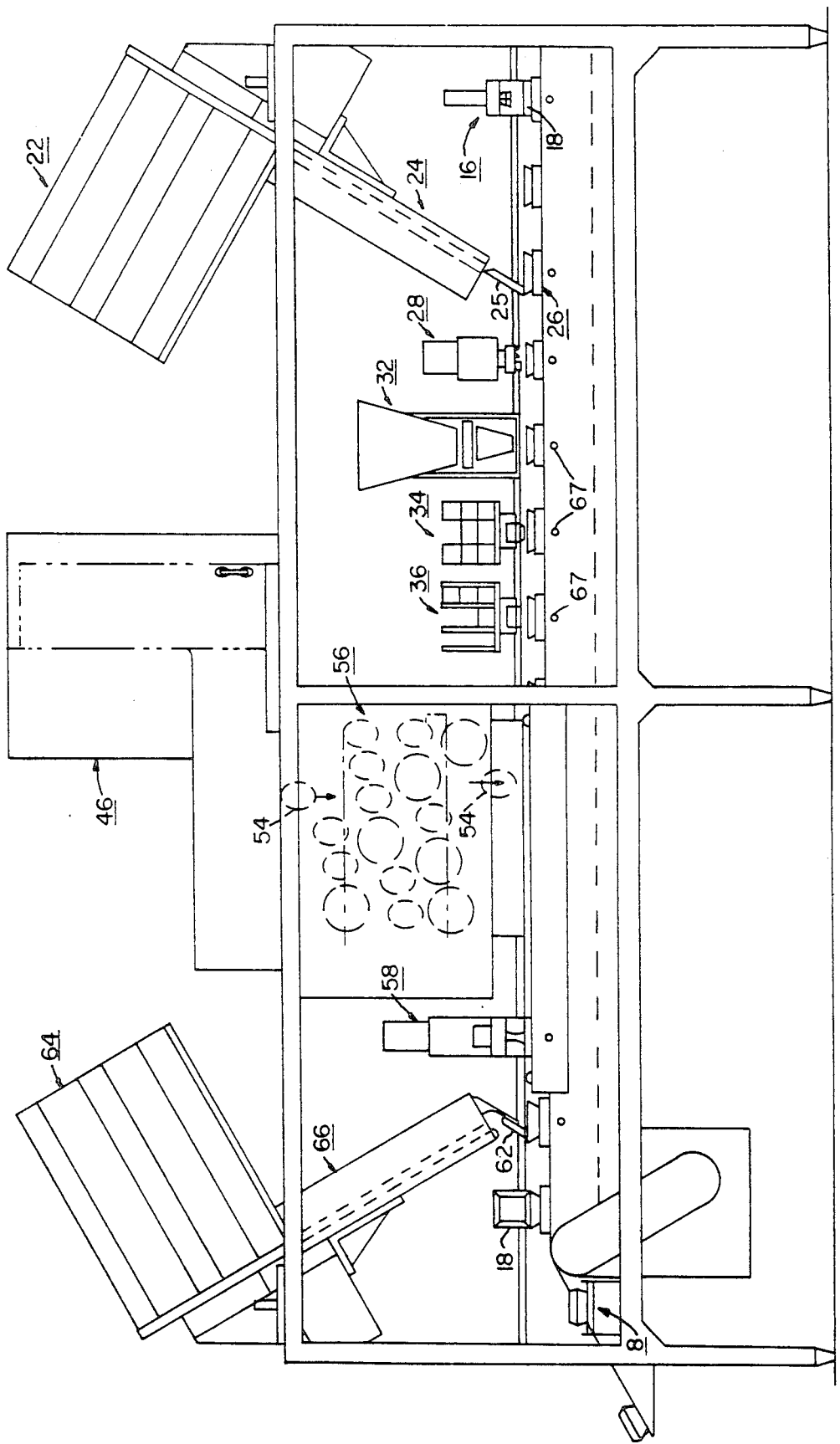
FIG. 2 is a front view of the food preparation and storage portion of FIG. 1.
Figure 3:
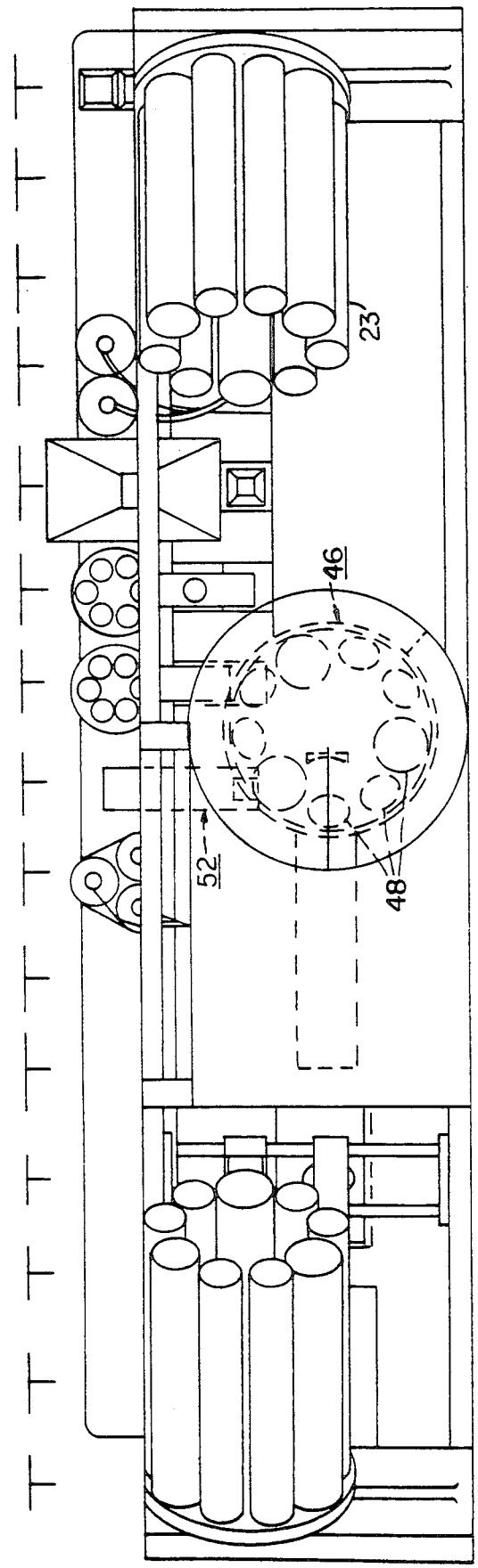
FIG. 3 is a top view of the system shown in FIG. 2.
Figure 4:
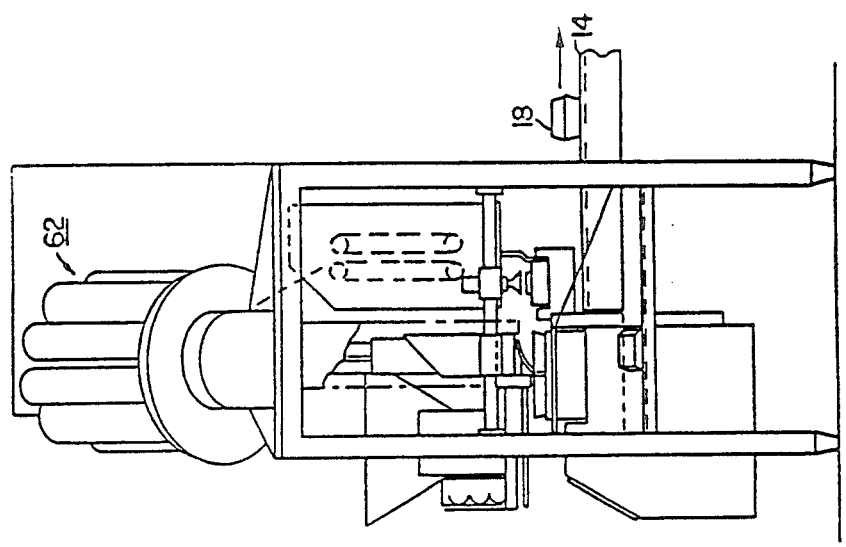
FIG. 4 is an end view of the system of FIG. 2.

The basic elements of the preparation system are shown by FIGS. 2, 3 and 4. When an order is received by the computer, a printing mechanism, diagrammatically illustrated at 16, prints the appropriate information on a carton 18 which may be of conventional construction, for example formed of insulating material with a folding lid. Simultaneously, a bun crown 25 is delivered from a "Lazy Susan" storage magazine, generally indicated at 22, to a grill, generally indicated at 24. The printed carton is transported by an indexing conveyor, generally indicated at 26, to a position at the output of the grill 24 where the crown 25 of the bun is placed, cut and toasted side up, in the carton 18. At the next conveyor station, the cut side of the crown is coated with a specified condiment, such as mustard or mayonnaise or a mixture of condiments, by an applicator 28. At the next station, chopped lettuce is added to the bun by a dispenser 32 unless the initial order specified that lettuce be omitted. The conveyor belt then advances one step to position the bun to receive tomato if called for in the order. A tomato slicer and dispenser 34 is loaded with tomatoes from which the end portions have previously been removed. The tomato may be delivered as two side-by-side or over-lapping slices or as one slice centered on the bun crown depending upon order preference.

At the next station, an onion slicer and dispenser 36 delivers one or more slices of onion, if called for in the original order. The dispenser 36 stores a quantity of onions, which have been peeled and the end portions removed, in a number of rotatable magazines. If called for in the order, a bacon dispenser 52 (FIG. 3) places one or more strips of bacon on the crown.

If pickle is specified in the order, a pickle dispenser places an appropriate amount of pickle on top of the cooked hamburger patty. The frozen meat patties are stored in a freezer 46 which contains a series of tubular magazines 48 (FIG. 3), arranged in a circle, which may be of different diameters to accommodate different sizes of patties. The magazines are rotated until a hamburger of the appropriate size is positioned at an exit window at the bottom of the stack of patties.

A cheese dispenser slices cheese from the bulk. The patty (or patties) and one or more slices of cheese are loaded to the crown by a patty/cheese loader 58.

A frozen meat patty 54 is fed into a broiler 56 at the same time the crown 25 is placed in the grill 24 both arriving at the patty/cheese loader 58.

At a suitable time to arrive simultaneously with the crown, the bottom portion 62 of a bun was fed from a storage chamber 64 into a grill 66. When the hamburger patty 54 arrives at this station, the toasted bottom portion of the bun is placed on top of the patty. The carton 18 is then closed and the carton inverted onto the delivery conveyor 8 (or conveyor 14 if directed to a drive-in window) to be carried to the area of the register where the original order was placed. Each station is provided with an indicator light, as shown at 67 in FIG. 2. indicates that the particular condiment should be fed to that particular sandwich so that in the event of a malfunction, the condiment may be loaded manually. The operator can then replenish the supplies or manually supplement the operation of the processor as indicated by a separate set of lights on a main control panel (not shown).

Figure 5:
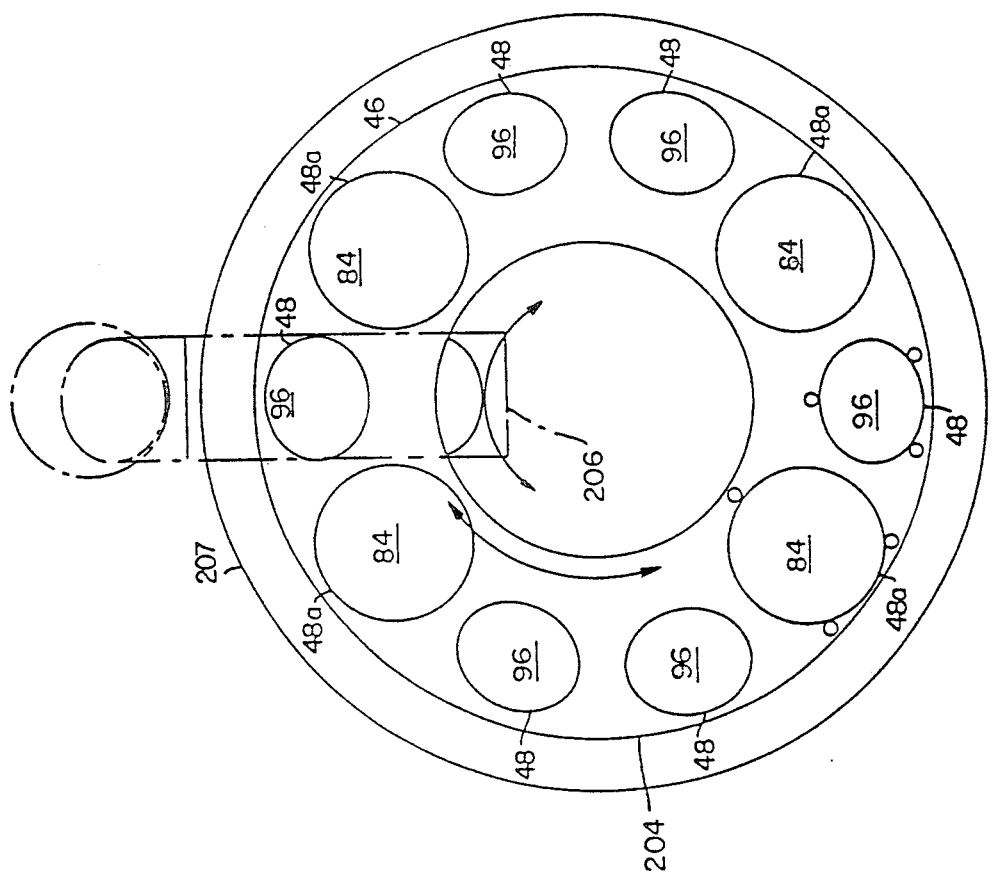
FIG. 5 shows a storage freezer for hamburger patties and mechanism for delivering the individual patties to a broiler.

Further details of the patty storage-dispenser 46, which is suitable for use in the automatic system, are shown in FIG. 5. The storage and dispensing functions are arranged to accommodate two sizes of patties. Six magazines 48 are of smaller diameter to receive the smaller patties while four larger magazines 48a accommodate the larger patties. In this example, the magazines 48 each hold 96 patties and the magazines 48a each hold 84 patties to provide a total storage capacity for 920 hamburger patties. When a hamburger patty is to be dispensed, a carriage 204 is rotated to bring an appropriate magazine 48 or 48a opposite a pusher block 206. The pusher block is then moved radially outwardly so that its arcuate surface engages the lowermost patty in the adjacent magazine and pushes it outwardly to drop into the broiler. The carriage 204 is surrounded by an insulated freezer wall 207.

Sanitation is an important element in food processing and serving. The systems described here have the marked advantage that the hamburger sandwiches can be prepared, custom cooked, and provided with selected condiments without contact with human hands at any point. However, frozen hamburger patties may be subjected to handling in formation, transport or loading into the retail processing system.

Figure 6:
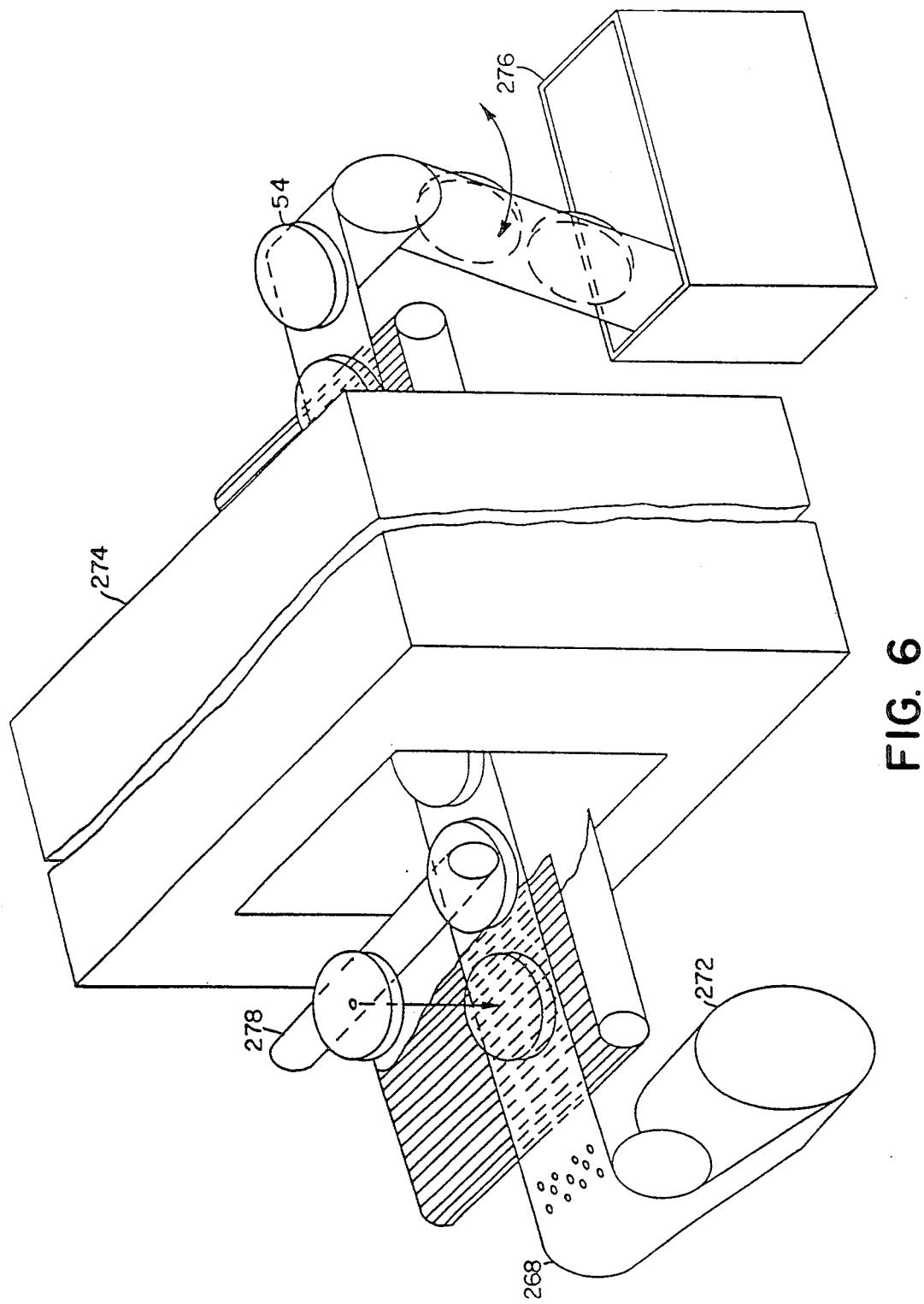
FIG. 6 illustrates a method of freezing and packing hamburger patties for efficient loading into an automatic broiler.

For maximum efficiency at the retail food establishment, it is desirable to package the frozen patties in a manner that will permit rapid loading of the storage area of the hamburger processing equipment. FIG. 6 illustrates a system for packing the hamburger patties that increases the sanitation standards and also provides advantages in machine handling. As shown, a plastic strip 268 is fed from a supply roll 272 through a freezer chamber 274 and into a shipping carton 276. At the entrance to the freezer chamber 274, fresh meat patties are placed on the plastic strip and pressed against its surface by a roller 278. This pressure will cause the patty to adhere to the plastic strip 268 sufficiently to permit the subsequent handling operations. If necessary, the adhesion to the plastic may be increased by using a dimpled or perforated plastic strip. At the other end of the freezer chamber 274, the plastic strip carrying the hamburgers is festooned into the shipping carton 276, that is, the plastic is folded into a zig-zag pattern as it is packed into the carton.

Figure 7:
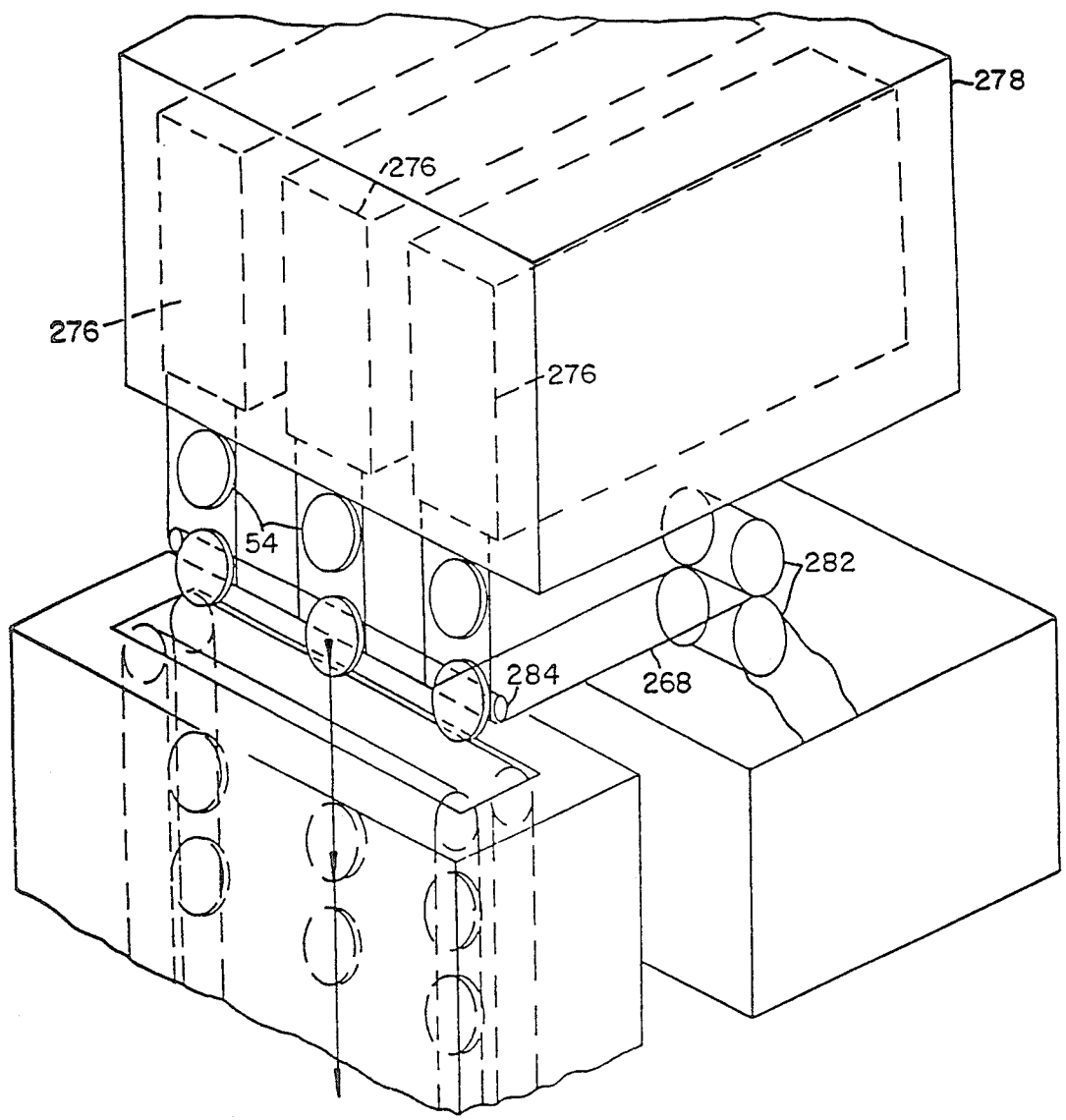
FIG. 7 shows a broiler system making use of meat patties packed in the manner illustrated by FIG. 6.

These shipping cartons 276 are designed to fit into a freezer storage chamber 278 (FIG. 7) at the retail food establishment. To feed the patties into the broiler, the plastic strip 268 carrying the hamburger patties 54 is pulled from the shipping carton 276 by a pair of nip rollers 282. In traveling from the carton 276 to the nip rollers, the plastic strip passes partially around a small-diameter peel-off roller 284. This sudden change in the path of the plastic strip causes the hamburger patty to be stripped from the plastic support to be received by the broiler mechanism. As illustrated, a number of cartons 276 may be placed in the freezer chamber 278 for simultaneous or independent supply to the broiler mechanism.

Figure 8:
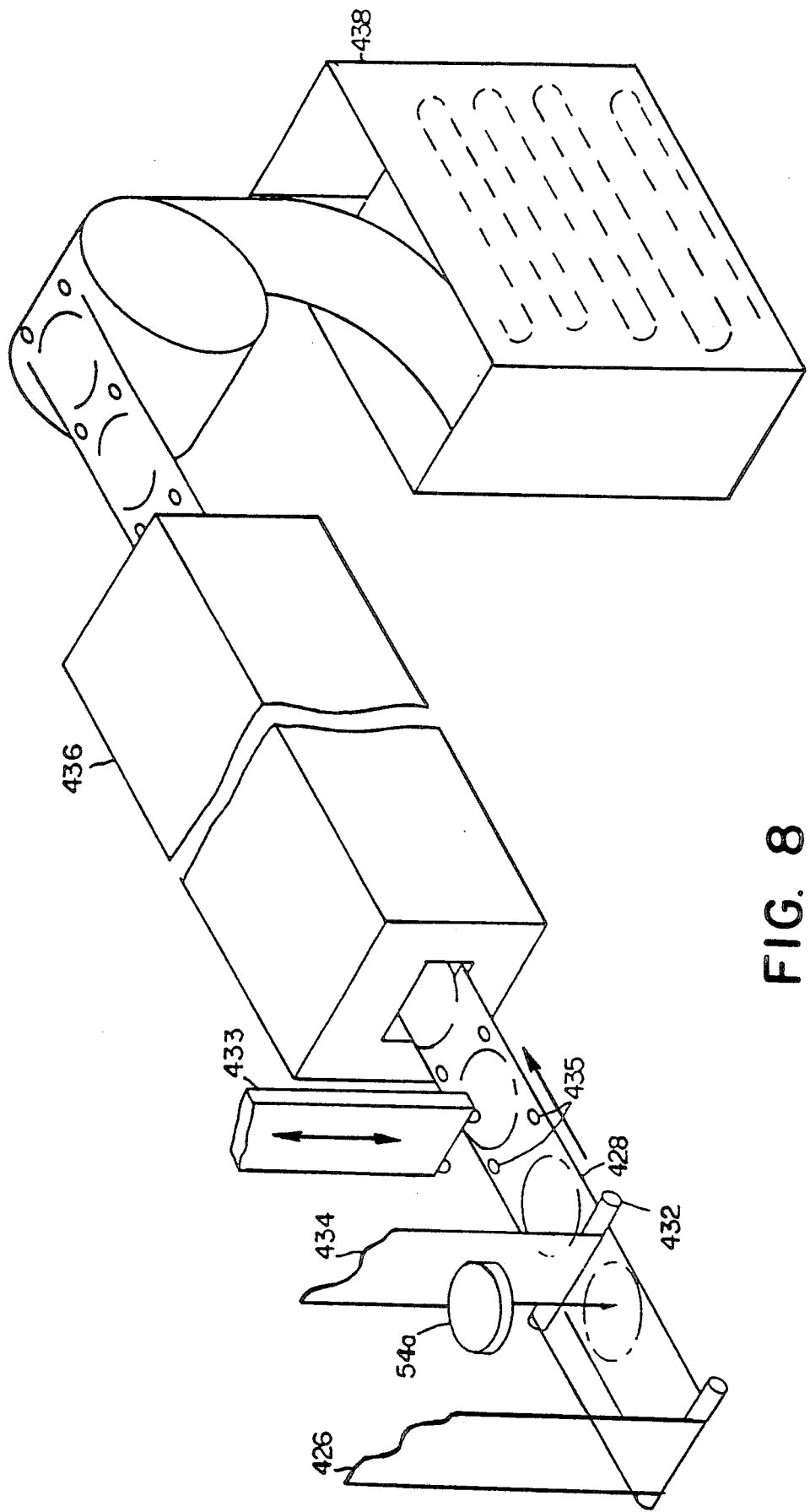
FIG. 8 illustrates a modified method of packing and storing meat patties or other serving portions of food products.

An alternative arrangement using two strips of plastic is shown in FIG. 8. The fresh, shaped patties 54a are placed on a strip 426 of plastic sheet. The hamburger patty is then carried by a conveyor belt 428 under a roller 432 around which passes a second strip 434 of plastic sheet. The two plastic strips are then fastened together by a heat seal 433 that seals the plastic at the points 435. An alternative sealing method places the dots in an arcuate formation nearer the patty so that, by stretching or deforming the plastic, the patties may be removed without breaking the heat seals. The hamburger patty is thus packaged between the two plastic sheets. The plastic strips containing the patties are then passed through a freezer 436 and packed in a festoon manner in a shipping carton 438.

Figure 9:
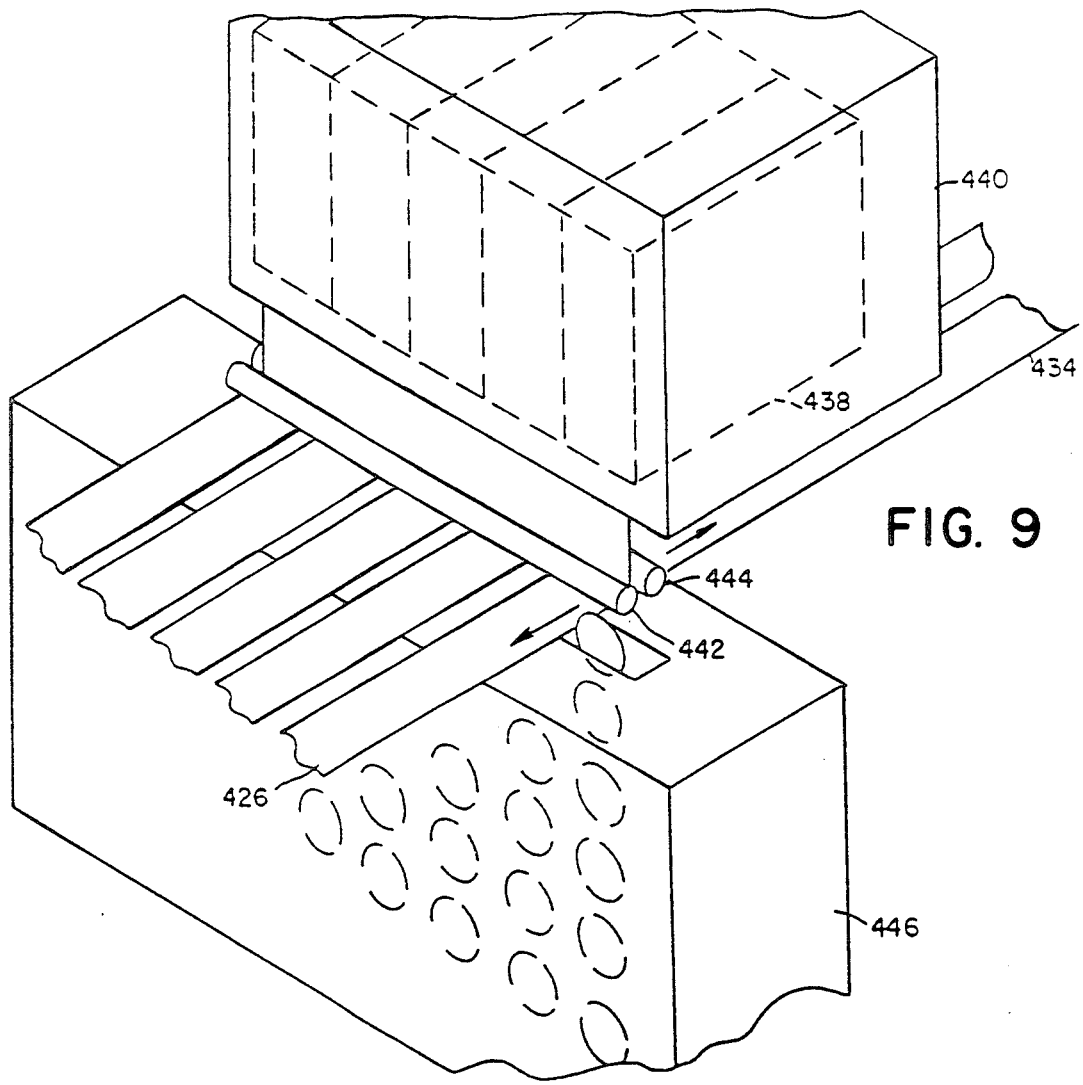
FIG. 9 illustrates a method for using meat patties packed as shown in FIG. 8 in automatic sandwich preparation.

At the retail food establishment (FIG. 9), the cartons 438 of hamburger patties are placed in a storage freezer 440. As hamburger patties are required, the composite strip containing the patties is automatically withdrawn from one of the cartons 438 and passed between two rollers 442 and 444. Immediately after passing between these rollers, one strip 426 of plastic is drawn away at a right angle from the previous direction of travel, rupturing the heat seal. The other strip 434 is drawn in the opposite direction. The strips thus separated free the encased patty to allow it to drop into a vertical broiler 446. The freezer 440 may contain any desired number of shipping cartons necessary to meet the requirements of the broiler 446.

Instead of the dot seals described above, the meat patty may be held in place by one or more line seals either continuous or formed by a series of spaced dot seals. This arrangement broadens the applications of the concept. For example, condiments such as chopped vegetables may be pre-packaged in serving portions in the successive pockets defined by line seals either continuous or intermittent. The use of continuous line seals, forming pockets that are square, rectangular, circular or some other shape, permits the pre-packaging of portion-size liquid condiments such as mustard, catchup and the like. In either case, the individual pockets are opened by physically tearing the two plastic strips apart. The dimensions of either the series sealing dots or lines must be dimensioned to permit the separation of the plastic strips without the application of excessive force or distortion of the packaging material to the extent that it interferes with the delivery of the contents. When plastic strips are heat sealed, it is preferred that the width of the line seals be between 1 and 3 millimeters and, if dot seals are used, that the area of the individual dots be between 2 and 5 square millimeters.

To be economical in practical applications the strips must be long enough to be handled by automatic machinery and it is preferred that each strip include at least fifty separate food pockets. The minimum operative strip must contain at least ten separate spaced food pockets.

Figure 10:
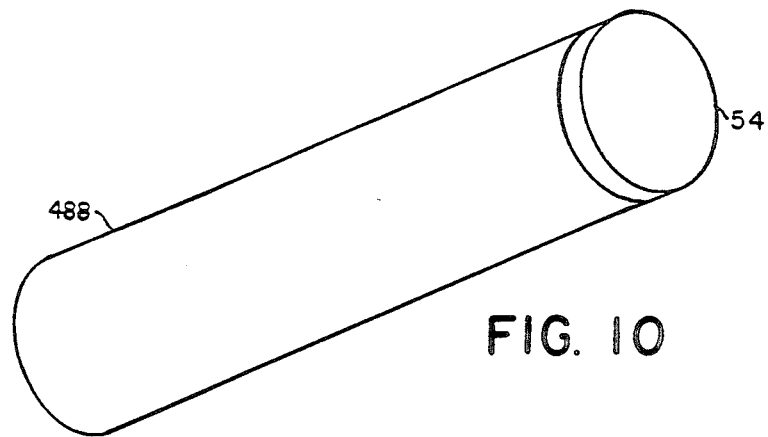
FIG. 10 shows an alternative method for packing and shipping meat patties for use in an automatic dispensing system.

An alternative method of treating the hamburger for shipment to the retail establishment is illustrated in FIG. 10. The ground meat is formed into a meat log 448 having the same diameter as the desired hamburger patties. The meat is packaged and shipped in this form.

At the retail hamburger processor, an automatic meat saw mechanism cuts the individual patties from the meat log as required.

We claim:

1. An automatic sandwich preparation system including
    conveyor means,
    a supply of bread rolls having first and second portions,
    first storage means for storing a supply of said first portions of said bread rolls,
    second storage means for storing a supply of said second portions of said bread rolls,
    means for dispensing said first portions of said bread rolls onto said conveyor means,
    a meat patty supply comprising
        a plurality of pre-formed meat patties,
        a first strip of plastic material with said patties in spaced positions therealong, and
        positioning means for maintaining said patties in said spaced positions,
    means for separating said patties from said plastic strip,
    means for cooking said patties, and
    means for placing each of the patties on one of said first portions of said bread rolls.

2. The combination as claimed in claim 1 including
    a second strip of plastic material facing said first strip with said patties positioned therebetween, and wherein
    said positioning means includes a series of areas where said second strip is sealed to said first strip.

3. The combination as claimed in claim 2 wherein
    said areas comprise spaced dots defining a series of pocket areas each containing one of said patties.

4. The combination as claimed in claim 3 wherein the area of each of said dots is between two and five square millimeters.

5. The combination as claimed in claim 2 wherein
    said areas comprise lines defining a series of pocket areas each containing one of said patties.

6. The combination as claimed in claim 5 wherein
    the width of said lines is between one and three millimeters.

7. The combination as claimed in claim 1 wherein
    said means for separating said patties from said strip comprises
    means causing said strip to pass around a radius of curvature substantially less than the average radius of said patties thereby releasing said patties from said strip.

8. The combination as claimed in claim 2 wherein
    said means for separating said patties from said strips comprises
        means for physically separating said strips thereby to free said patties.

9. The combination as claimed in claim 8 wherein
    said means for separating said strips includes
        means causing at least one of said strips to follow a path having a radius of curvature less than the radius of said patties relative to the path of the other of said strips.

* * * * *